Figures 1, 2:
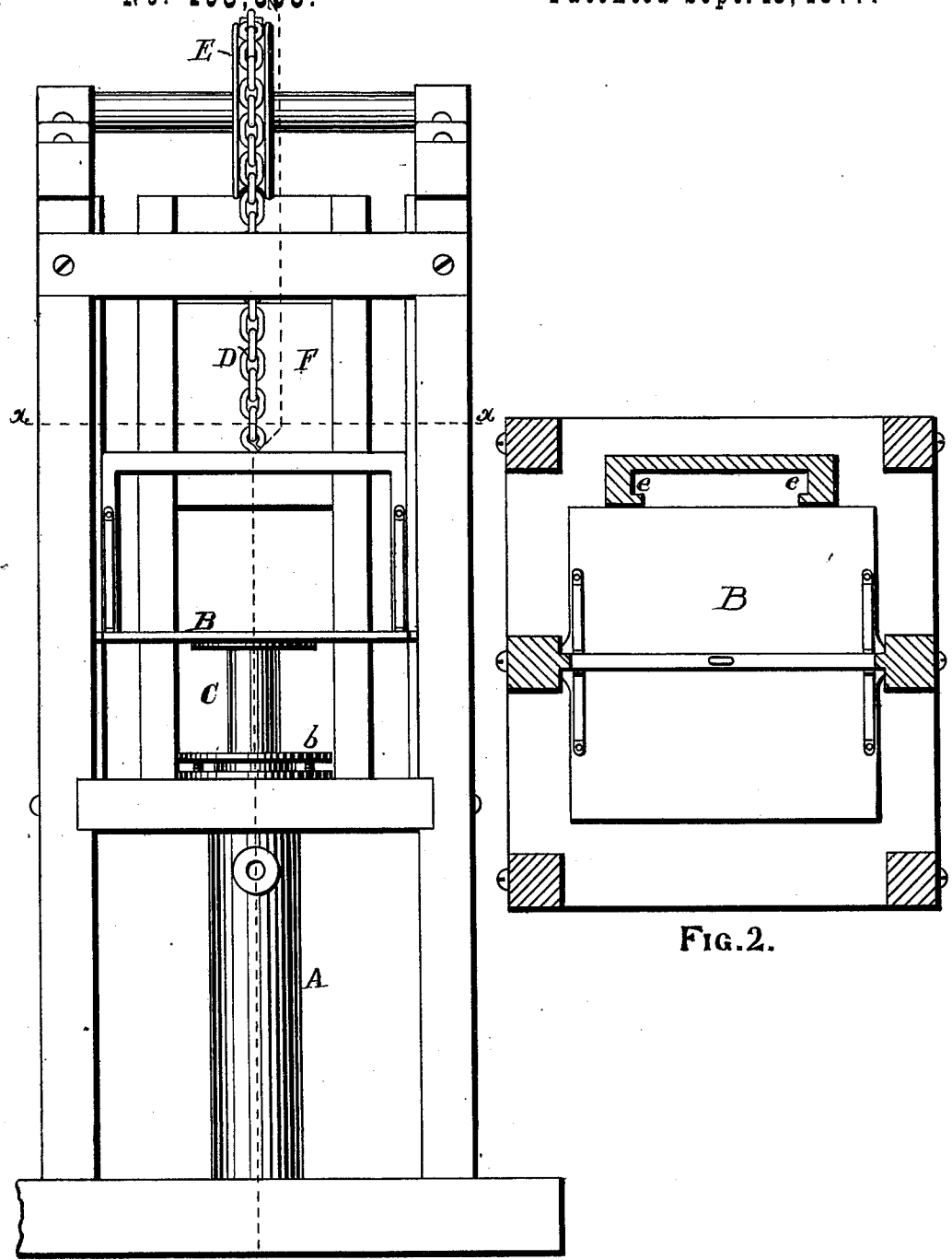

H. R. PLIMPTON.
COUNTERBALANCES FOR ELEVATORS.

No. 195,305. Patented Sept. 18, 1877.

3 Sheets—Sheet 1.

WITNESSES.
Wm. P. Edwards
E. A. Hemmenway

INVENTOR.
Henry Richardson Plimpton

3 Sheets—Sheet 2.

H. R. PLIMPTON.
COUNTERBALANCES FOR ELEVATORS.

No. 195,305. Patented Sept. 18, 1877.

WITNESSES. INVENTOR.

UNITED STATES PATENT OFFICE.

HENRY R. PLIMPTON, OF BOSTON, MASSACHUSETTS.

IMPROVEMENT IN COUNTER-BALANCES FOR ELEVATORS.

Specification forming part of Letters Patent No. 195,305, dated September 18, 1877; application filed November 19, 1875.

*To all whom it may concern:*

Be it known that I, HENRY R. PLIMPTON, of Boston, in the county of Suffolk and State of Massachusetts, have invented a new and useful Improvement in Counter-Balances for Elevators, and for other purposes, of which the following, taken in connection with the accompanying drawings, is a specification.

My invention relates to a variable descending counterbalance-weight, adapted to equalize or compensate for a constant or regular variation in the weight of the load to be raised, and is more especially applicable to that class of elevators in which the car and its load are raised by the pressure of a column of water acting directly upon a piston working in a vertical cylinder placed entirely below the lowest point to which the car is designed to descend, and carrying the load to be raised at its upper end, said cylinder and piston being of a length somewhat greater than the whole height of the lift; and has for its object the equalization of the load to be raised to the pressure of the water at all points of the ascent, or, in other words, the application of a variable counter-balance in such a manner as to compensate for the increase of the load to be raised, which is due to the variation of the buoyant power of the water as the piston moves from its lowest to its highest position.

It is a well-known fact that a solid body floating in or on the water weighs less, or it may be raised with less power exerted, than when suspended in the atmosphere, the difference being just equal to the weight of water displaced; hence it follows that a piston of the kind above described, when immersed its whole length in water, weighs considerably less than when only half immersed, and still less than when its lower end only touches the surface of the water. Owing to this fact it has been found that, while elevators of this class work well and economically for short lifts, they are not economical for lifts of fifty to one hundred feet, for the reason that to raise one thousand pounds sixty feet high a power of about sixteen hundred and fifty pounds must be exerted through the whole length of the lift.

My invention is designed to obviate this objection; and it consists in the use, in combination with an elevator-car or other weight to be raised, operated, or moved by the direct pressure of a column of water acting upon a piston carrying the load at its upper end, and working in a vertical cylinder, of a chain or other flexible connection attached at one end to the car or piston, and passing over a pulley drum or sheave placed above the highest point to which the car ascends, and having secured to its other end a constant and invariable weight of a capacity sufficient to nearly counterbalance the weight of the piston, car, and a length of the chain leading from said weight to the car, equal to the whole height of the lift of the car, said connecting-chain or other flexible connection made of such a size and weight that, as the piston ascends and the power or buoyancy of the water acting upon the piston diminishes, and the weight of load being raised is correspondingly increased, a corresponding weight of the flexible counterpoise chain shall be added to the weight of the constant counterbalance-weight attached to its end by a given weight being transferred from one side of the suspension pulley or sheave to the other side thereof, and thus increasing the weight of the descending counter-balance just in proportion to the increased weight of the load. This result is accomplished by making the flexible counter-balance of a weight per foot in length proportionate to the weight of water displaced by every foot of movement of the piston, as will be hereainfter described.

Figures 3, 5:
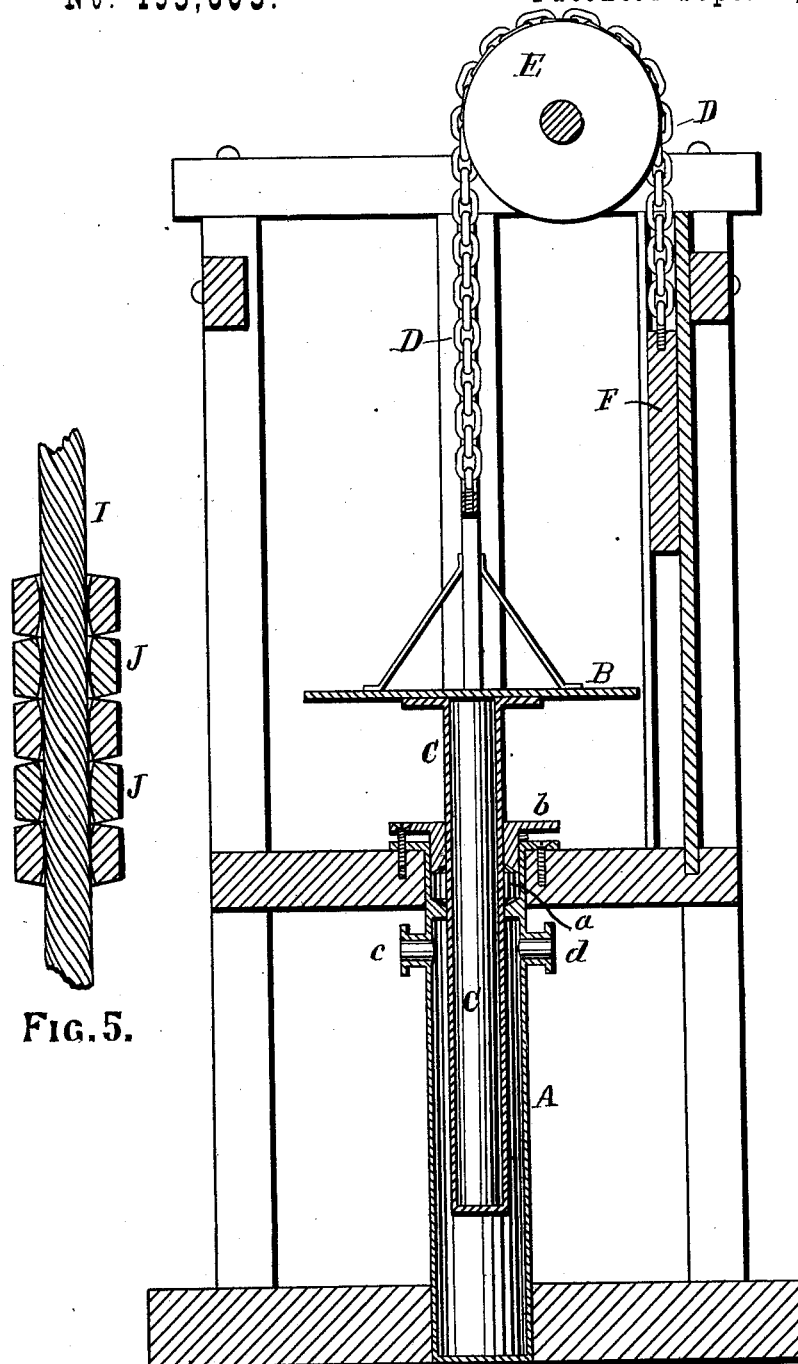
Figure 4:
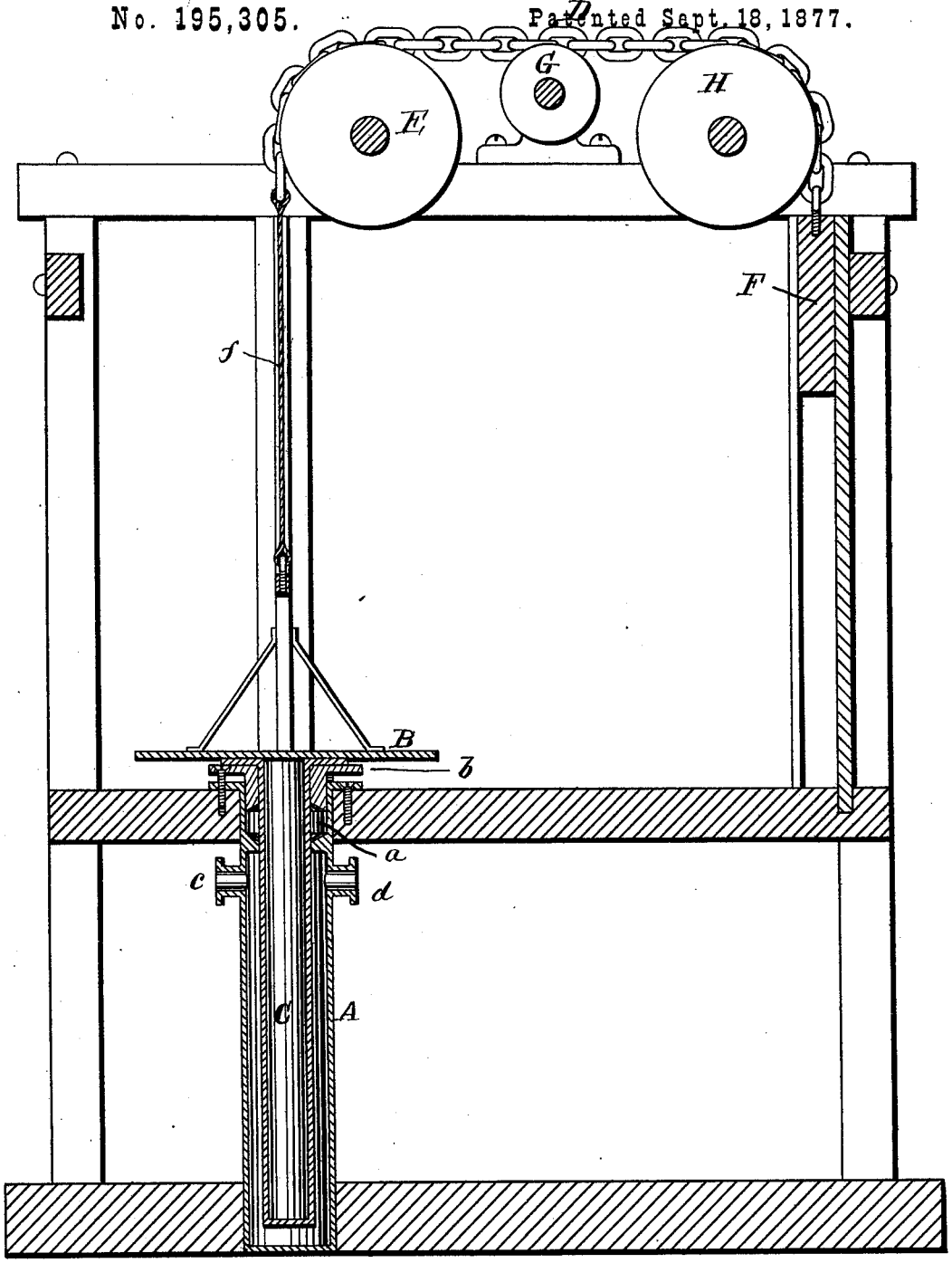

In the drawings, Figure 1 is a front elevation of an elevator illustrating my invention. Fig. 2 is a horizontal section on line $x\ x$ on Fig. 1. Fig. 3 is a vertical section on line $z\ z$ on Fig. 1, and Fig. 4 is a similar section illustrating a modification of my invention.

A is a cylinder, closed at its lower end, and provided at its upper end with a suitable stuffing-box, $a$, and adjustable gland $b$, and also provided with an inlet-passage, $c$, and outlet-passage $d$, located near its upper end or just below the stuffing-box, as shown.

The cylinder A is set in the ground in a perpendicular position entirely below the lowest point to which the car B is designed to descend, and must be of a length somewhat greater than the whole height of the lift of the car, as must also be the piston C, which works therein, and has secured to its upper end the car B, all of which are constructed and arranged in a well-known manner. The necessary supply and discharge pipes and valves, and the means of operating the valves from the car, (not shown in the drawings,) may be supplied in any well-known manner.

D is a chain, attached by one end to the car B, and, passing over the sheave or pulley E, has secured to its other end the dead-weight F, fitted to move up and down in suitable guides e e, and so proportioned as to nearly counterbalance the piston C, car B, and a length of the chain D equal to the height of the whole lift of the car when the car and piston are in their lowest position.

The chain D must be of such a size that a length of it equal to the whole lift of the car shall weigh just one-half as much as the water displaced by the piston when in its lowest position. If, now, a pressure of water just sufficient to raise the car and the load placed thereon be admitted to the cylinder A, the car and its load will begin to move upward, being compelled thereto by the pressure of water on the lower end of the piston C, and at each foot of rise of the car a foot in length of the chain D will pass over the pulley E, thus deducting its weight from the load being raised, and adding it to the weight of the descending counter-balance F, which change is just sufficient to compensate for the increase of the weight of the load due to the decreased amount of water displaced by the piston.

In the modification illustrated in Fig. 4, the heavy chain, or other flexible counterpoise, to one end of which the weight F is attached, is supported entirely upon pulleys E, G, and H, in a horizontal position when the car is in its lowest position, being connected at its other end to a wire rope, f, or other suitable connecting medium of much less weight leading therefrom to the car.

In this case the chain D must be of such a size that a length of it equal to the height of the lift will weigh just as much as the water displaced by the piston when in its lowest position.

If the piston and car be raised, every foot of such rise will cause one foot of the chain D to pass off from the pulley H, and thus be added to the counter-balance, which just compensates for the increased weight of the load due to the diminished buoyant power of the water caused by reduced amount displaced by the piston when it has been raised one foot.

Instead of the chain D, a wire or hemp rope may be used, of sufficient strength to safely carry the load, and the necessary weights may be added thereto in various ways to make a length of the same equal to the height of the lift weigh as much as the water displaced by the piston when in its lowest position, said weights being evenly distributed over the whole length of the wire rope when the modification shown in Figs. 1, 2, and 3 is used, and over that portion only which lies in a horizontal position or above the lower edges of the pulleys E and H when the modification shown in Fig. 4 is used.

One mode of increasing the weight of the wire or hemp rope might be to inclose it in a series of short thimbles or rings, having their ends made partially spherical or conical, as shown in Fig. 5, where I is the wire or hemp rope, and J J metal thimbles or rings made of sufficient size to increase the weight of the rope the requisite amount.

Figure 6:
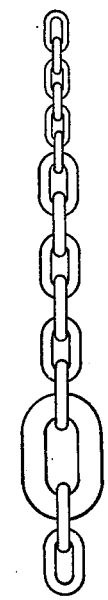

It is obvious that in cases where the load being raised is increased or diminished suddenly at intervals as a regular and constant thing, other than by the varying pressure of the water, as in the case of a telescopic piston, the flexible variable descending counter-balance may be made to perfectly equalize the load by making the chain or other flexible connecting medium between the load and dead-weight counterbalance in sections of different sizes or tapering from one end to the other in either direction, as shown in Fig. 6.

I do not claim, broadly, connecting a counterbalance-weight to an elevator, car, or other weight to be raised by means of a chain or other flexible connection, as I am aware that that is a common device in every-day use; but

What I claim as new, and desire to secure by Letters Patent of the United States, is—

1. The combination of the cylinder A, piston C, car or platform B, the constant counter-balance-weight F, and the chain B, made of such a weight that a length thereof equal to the whole height of the lift shall be just equal to one-half the weight of the column of water displaced by the piston when in its lowest position, substantially as described.

2. The combination of the cylinder A, piston C, car or platform B, constant counter-balance-weight F, two or more pulleys, E, G, or H, the wire rope or other light flexible connection f, and the chain D, extended in a horizontal position on the pulleys E, G, or H, when the piston C is in its lowest position, and made of such a weight that a length thereof equal to the height of the whole lift shall be equal to the weight of the column of water displaced by the piston when in its lowest position, substantially as, and for the purposes described.

3. As a means of connection between a load to be raised and a dead-weight counterpoise, a wire or other rope or cord having strung thereon or otherwise secured thereto a series of thimbles, rings, or other weights, distributed evenly or at certain stated and specified intervals along its length, as and for the purposes described.

4. As a means of connection between a load to be raised and a dead-weight counterpoise, a chain or other flexible connection having certain specified and defined portions of its length made of different weights, substantially as shown and described, for the purposes specified.

Executed at Boston this 16th day of November, 1875.

HENRY RICHARDSON PLIMPTON.

Witnesses:
WM. P. EDWARDS,
E. A. HEMMENWAY.